United States Patent [19]
Ochiai et al.

[11] 3,792,995
[45] Feb. 19, 1974

[54] PROCESS FOR PRODUCING CEPHALOSPORIN DERIVATIVES

[75] Inventors: Michihiko Ochiai, Osaka; Osami Aki, Kawanishi; Akira Morimoto, Osaka; Taiiti Okada; Kazuo Shinozaki, both of Kyoto; Yutaka Asahi, Takarazuka; Katsutada Masuda, Ashiya, all of Japan

[73] Assignee: Takeda Chemical Industries, Ltd., Osaka, Japan

[22] Filed: Mar. 31, 1972

[21] Appl. No.: 240,286

[30] Foreign Application Priority Data
Apr. 5, 1971  Japan.............................. 46-20901

[52] U.S. Cl.............................. 204/72, 260/243 C
[51] Int. Cl. ...................... C07b 29/06, C07d 93/15
[58] Field of Search.... 204/59 R, 72, 73 R; 260/243

[56] References Cited
UNITED STATES PATENTS
3,444,057   5/1969   Throop .............................. 204/59 R FOREIGN PATENTS OR APPLICATIONS
1,140,975   1/1969   Great Britain .................... 204/59 R Primary Examiner—F. C. Edmundson
Attorney, Agent, or Firm—Wenderoth, Lind & Ponack

[57] ABSTRACT

Process for producing 3-ezomethylene cephalosporins by electrolytically reducing 7-amino- or 7-acylamino-3-(substituted methyl)-3-cephem derivatives.

11 Claims, No Drawings

PROCESS FOR PRODUCING CEPHALOSPORIN DERIVATIVES

The present invention relates to a process for producing novel cephalosporins having a 3-exomethylene group and more particularly to a process for producing 3-exomethylene compounds having the following general formula, or a salt or an ester thereof:

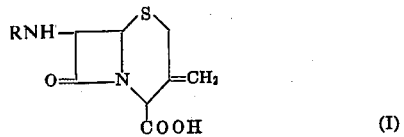

(I)

wherein R is a hydrogen or an acyl group.

The present inventors found that cephalosporins having a 3-substituted-methyl group, e.g. 7-amino or 7-acylamino-3-(substituted methyl)-3-cephem derivatives can be electrolytically reduced to give the cephalosporins having a 3-exomethylene group which can be further led to, for example, cephalosporins having a 3-methyl group, particularly 3-methyl compounds having the general formula;

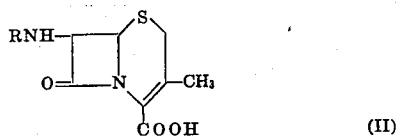

(II)

wherein R is as defined above.

The principal object of the present invention is to provide an industrially feasible process for producing novel caphalosporins having a 3-exomethylene group and more particularly 3-exomethylene compounds (I).

Another object of the present invention is to provide a novel and an industrially feasible process for producing cephalosporins having a 3-methyl group, particularly 3-methyl compounds (II).

Other objects of the present invention and advantages thereof will become apparent as the description proceeds.

According to the present invention, the 3-exomethylene compounds can be produced by subjecting cephalosporins having a 3-substituted-methyl group, e.g., 7-amino or 7-acylamino-3-(substituted methyl)-3-cephem-4-carboxylic acid or a salt or an ester thereof to electroreduction.

In the starting compounds, the acyl group involves the group derived from carboxylic acid or substituted carboxylic acid and may include any one which has been used as the N-acyl group of the known cephalosporin or penicillin compounds. Among such acyl groups, there are 5-amino-5-carboxyvaleryl and the corresponding 5-acylamino group, thienylacetyl, phenylglycyl and the corresponding N-acyl group, α-sulfophenylacetyl, α-carbamoylphenylacetyl, pyridylthioacetyl, phenoxyacetyl, 5-methyl-3-phenyl-4-isoxazolylcarbonyl, 1-cyclohexenylglycyl, cyanoacetyl, tetrazolylacetyl, β-ethylsulfonylethoxycarbonyl, β-phenylsulfonylethoxycarbonyl, β-methylsulfonylethoxycarbonyl, acylaminomethylphenylacetyl and the like. When the acyl group has a free amino group, the amino group may be previously masked with an amino group protecting group such as β-methylsulfonylethoxycarbonyl, isobornyloxycarbonyl and so on.

The substituted methyl group at the 3-position of the starting compounds may be any of the 3-substituents of the cephalosporins. Among them, preferable ones are the methyl groups substituted with, for example, an acyloxy, such as acetoxy, and carbamoylthio, an acylthio such as acetylthio and benzoylthio, a quaternary ammonium group such as 1-pyridinium group or a group of the formula -SR″ [R″ is an organic group such as alkyl (e.g., methyl, ethyl, vinyl), aryl (e.g., phenyl, p-tolyl), aralkyl(e.g., benzyl, phenylethyl), heterocyclic (e.g., pyridinium, 1-oxopyridinium, 2methyl-1,3,4-thiadiazolyl), acyl (e.g., acetyl, benzyl), cyano, thiocarbamoylthio, alkoxythiocarbonyl (e.g., methoxythiocarbonyl) or amidino, or an inorganic group such as sulfo, etc.] or which when taken together with the 4-carboxyl group, form a γ-lactone, γ-thiolactone or γ-lactam ring. The carboxyl group in the starting compounds may be in the form of the corresponding esters, e.g., methyl, ethyl, benzyl, methoxybenzyl, nitrobenzyl, phenyl, nitrophenyl, methoxyphenyl, benzhydryl, trichloroethyl, trimethylsilyl, methylsulfonylethyl and other esters, or the sodium, potassium, calcium, magnesium and triethylamine salts, etc.

The electroreduction according to this invention is carried out in a solution. Though any solvent can be used only if it will not be detrimental to the present reaction, one may usually employ any one of the following solvents or a mixture thereof: water, methanol, ethanol, ethylene glycol, tetrahydrofuran, dioxane, acetonitrile, acetone, methyl ethyl ketone, dimethylformamide, dimethyl sulfoxide and the like.

Furthermore, the addition of an inorganic salt or the so-called electrolyte to the reaction system usually enables the present reaction to proceed smoothly. Thus, generally the present reaction is desirably conducted within the pH range of 2 to 7 and, in this connection, one may add to the reaction system an inorganic salt which is generally used in buffer solutions, e.g., sodium phosphate, sodium acetate, sodium lactate, sodium citrate, potassium hydrogen phthalate or sodium borate, so as to maintain the reaction mixture at a constant pH between 2 and 7. In this manner, one may successfully conduct the reaction of this invention without trouble. Aside from those salts, the addition of a conventional electrolyte such as lithium chloride, lithium bromide, a quaternary ammonium salt, e.g., tetramethylammonium bromide, sodium sulfate, sodium chloride, potassium bromide, chromium acetate, chromium sulfate or chromium chloride, enables the reaction to be conducted smoothly and expediently. Particularly when one of the aforementioned organic solvents or a mixture of such a solvent and water is employed, the addition of an electrolyte leads to satisfactory results. The type and concentration of the above-mentioned inorganic salts or electrolytes are controlled by, and determined with reference to, the type of starting compound, pH valve, applied voltage and other conditions.

While the reaction temperature depends upon such factors as the type and concentration of the starting compound, the applied voltage and the type of solvent used and usually lies in the range of 0° to 100°C, one should avoid high temperatures to prevent decomposition of the starting material and product compound (I)

and to avoid occurence of undesirable side reactions.

The type of electrode is not especially critical and one may select the proper electrode, taking into consideration the other conditions to be employed in the reaction of this invention, from among those of mercury, lead, carbon, silver, platinum, nickel, palladium, tin, tungsten, aluminum, magnesium, zinc and others. It is desirable that both electrodes are separated from each other with a partition which has suitable porosity for inhibiting the cephalosporin compound from flowing to the anode. As the said partition, there may be used a semipermeable membrane, a sintered glass, an ion-exchange membrane, a porous plate, an asbestos and so on. The reaction is accelerated by a mechanical stirring of the reaction mixture. For the production on an industrial scale the circulation-method or the flow-method may be, in some cases, beneficial.

The applied voltage should also be determined with reference to the other conditions, e.g., the type and concentration of the starting compound and of additives, the type of solvent, pH value, reaction temperature and time, etc. The current density is generally in a range of $0.1 - 10$ mA/cm$^2$, and preferably of $0.5 - 8.8$ mA/cm$^2$, though these ranges are not critical.

While the reaction time, like the other conditions, could be determined with reference to the type and concentration of the starting compound and of inorganic salts or electrolytes, the type of electrode, the type of solvent, pH value, applied voltage, etc., the end point of the reaction is generally ascertained from the disappearance of the starting compounds. When a suitable solvent is employed, one may trace the decrease with time of the ultraviolet absorption of the $\Delta^3$-cephem ring at 260 m$\mu$ and assume the time of disappearance of the absorption to be the end point of the reaction. The 3-exomethylene compounds obtainable by the process of this invention can be purified by such techniques as column chromatography, extraction, isoelectric precipitation, countercurrent distribution and recrystallization.

Thus-obtained 3-exomethylene compounds, for example, can be converted to the 3-methyl compounds, by isomerizing them directly or, after chemical modifications, e.g., deacylation or acylation, etc.

The isomerization reaction can be carried out by contacting the 3-exomethylene compounds with a catalyst, e.g., such adsorbents as silica gel, alumina, etc. as well as aromatic or tertiary amines (e.g., pyridine, picoline, lutidine, quinoline, isoquinoline, dimethylaniline, triethylamine, N-methylpiperidine), etc. or a mixture thereof.

This reaction, in general, can be conducted in a solvent, for example, any of such organic solvents as methanol, ethanol, acetone, tetrahydrofuran, dioxane, chloroform, ethyl acetate, ether, benzene, dichloromethane, etc; such basic solvents as aromatic or tertiary amines mentioned above or a mixture thereof.

In the isomerization reaction, the 3-exomethylene compounds (I) are desirable to be in the ester form, of which the ester residue is exemplified by an organic group such as methyl, ethyl, benzyl, benzhydryl, methoxybenzyl, isobornyl, methylthiomethyl, $\beta$-methylsulfonylethyl, phenyl, nitrophenyl, $\beta$-trichloroethyl, etc., or an inorganic group such as trimethylsilyl, dimethylsilenyl, etc. Incidentally, when a polyfunctional esterifying agent such as dimethyldichlorosilane is employed, the ester residue may contain one or more cepham nuclei. The temperature and time of this isomerization reaction depend upon such factors as the types of starting compounds, solvent, and any catalyst used to accelerate the isomerization. Generally, those variables are selected within the range of 0° to 100°C and the range of a few minutes to several days.

Among the 3-exomethylene compounds, the compounds having an acyl group at the 7 position may be converted to the corresponding 7-amino compounds by deacylating at the 7-position, and subjecting the 7-amino compounds thus-obtained to the isomerization reaction and then to the acylation reaction to be explained below. The order of the latter two reactions can be altered if desired. Those procedures are preferably adopted for such compounds as derived from cephalosporin C.

The deacylation reaction can be effected in a similar manner as in the production of 7-aminocephalosporanic acid from cephalosporins. For example, when the adipoyl groups at the 7-position of 3-exomethylene compounds have a free amino group, the 7-amino compounds can be obtained by treating them with a nitrosation agent, followed by hydrolysis. The nitrosation agent includes, for example, nitrosyl chloride, nitrosyl bromide, nitrous acid, aliphatic alcohol esters of nitrous acid, nitrogen dioxide, nitrosylsulfuric acid and the like. This reaction is usually carried out in a solvent. Such aliphatic acids as formic acid, acetic acid and the like are commonly used as the solvent. Alternatively, mixtures of these acids and conventional organic solvents such as benzene, toluene, nitromethane, dichloromethane, chloroform, tetrahydrofuran and the like may be used. It is preferable to conduct the reaction under cooling in order to suppress the undesirable side reactions. The reaction product can be hydrolyzed without isolation.

When the acyl groups at the 7-position of the 3-exomethylene compounds have no free amino group, the 7-amino compounds can be produced by treating 3-exomethylene compounds with an imido halide forming agent and thus-obtained imido halide is converted into an imino ether, followed by hydrolysis. These reactions may be also applicable to the cephalosporin compounds having a protected amino group, the protecting group of which does not interfere with this reaction; for example, benzyloxycarbonyl, methoxycarbonyl, t-butoxycarbonyl, i-butoxycarbonyl, $\beta$-methylsulphonylethoxycarbonyl, isobornyloxycarbonyl and the like. The imido halide forming agent may be a halide derived from carbon, phosphorus or sulfur, or an oxyhalide derived from their oxyacids. They include, for example, phosphorus oxychloride, phosphorus pentachloride, phosphorus trichloride, thionyl chloride, phosgene, oxalyl chloride and the like. The imido halide forming reaction is advantageously conducted in a solvent. The preferable solvent is a tertiary amine such as triethylamine, pyridine, dimethylaniline or the like. After the imido halide formation, an alcohol is added to the reaction mixture to obtain the corresponding imino ether. The alcohol employed in the imino ether formation may be a lower alcohol such as methanol, ethanol or the like. It is preferred to conduct the above-mentioned reactions under cooling in order to suppress the undesirable side reactions. Thus-obtained imino ether is hydrolyzed with water to give 7-amino compounds. This hydrolysis may be carried out smoothly by adding a small quantity of acid such as formic acid, acetic acid, etc. On the completion of the hydrolysis, the pH of the reaction mixture is adjusted to be within the range from 3.5 to 4.0 to yield in a high purity the desired 7-amino compounds. In these deacylating reactions, the carboxyl group of the starting 3-exomethylene compounds may be protected as in the form of an ester such as the benzyl, β-methylsulphenylethyl, benzhydryl, trimethylsilyl ester and the like.

The 7-amino compounds may be acylated with a suitable carboxylic acid or its functional derivatives to prepare the desirable cephalosporin compounds having excellent antibiotic activity. The desirable carboxylic acids employed for the acylation include phenylglycine or its substituted derivatives at the amino group, phenylacetic acid, p-nitrophenylacetic acid, 1-cyclohexenylglycine or its substituted derivatives at the amino group, trimethylcyclohexenylglycine, thienylacetic acid, α-sulfophenylacetic acid, tetrazolylacetic acid, and the like. The substituent of the above-mentioned amino group includes methoxycarbonyl, benzyloxycarbonyl, t-butoxycarbonyl, isobornyloxycarbonyl, benzoyl, nitrobenzoyl and the like.

In the acylation reaction, when a free carboxylic acid is employed as the acylating agent, it is advantageous to use a suitable condensing agent. The condensing agent includes, for example, N,N'-disubstituted carbodiimides such as N,N'-dicyclohexylcarbodiimide and the like; azolide compounds such as N,N'-carbonylimidazole, N,N'-thionyldiimidazole and the like; and such dehydrating agents as N-ethoxycarbonyl-2-ethoxy-1,2-dihydroquinoline, phosphorus oxychloride, alkoxyacetylene and the like. The functional derivatives of the carboxylic acids include acid halides, acid anhydrides, mixed acid anhydrides, active amides, esters and the like. Particularly usable examples are acid chloride, alkylcarbonic acid anhydrides, mixed anhydrides with an aliphatic carboxylic acid, acid azolides and the like. This reaction, in general, can advantageously and smoothly be conducted in a solvent. The solvent may be any solvent or solvent mixture so long as it does not interfere with the reaction of the present invention. These include water, acetone, tetrahydrofuran, dioxane, acetonitrile, chloroform, dichloromethane, dichloroethylene, pyridine, dimethylaniline, dimethylformamide, diemthylacetamide, dimethyl sulfoxide and the like. The reaction temperature is not critical. However, the reaction is usually carried out under cooling or at room temperature. According to the present processes, 3-deacetoxycephalosporanic acid derivatives can be obtained in a high purity and in a good yield without use of a large amount of an expensive metal catalyst in the catalytic hydrogenolysis of caphalosporanates.

It is to be understood that the following examples are solely for the purpose of illustration and not to be construed as a limitation of this invention.

In this specification, "part" means "weight part" unless otherwise specified, and the relationship between "part(s)" and "part(s) by volume" corresponds to that of gram(s) and milliliter(s).

EXAMPLE 1

In 2,000 parts by volume of a buffer (pH 4; 0.1 M (molality) sodium acetate and 0.1 M acetic acid) is dissolved 10 parts of sodium 7-(2'-thienylacetamido)-cephalosporanate, and the solution is electrolyzed in a cell which contains a mercury pool cathode and a horizontal platinum sheet anode, separated from one another by means of a sintered glass partition of medium porosity, at room temperature under stirring with a current of about 50 mA at 15 volts. After 8 hours, the reaction mixture is adjusted to a pH of 2 with dilute hydrochloric acid and, then, extracted with ethyl acetate. The ethyl acetate layer is washed with water and dried, followed by the addition of sodium 2-ethylhexanoate until no more precipitation occurs. The resulting precipitate is collected to obtain 6.8 parts of sodium 7-(2'-thienylacetamido)-3-exomethylenecepham-4-carboxylate. This product shows in the infrared spectrum (KBr disc) an absorption due to the β-lactam at 5.75 μ and that of the exomethylene group at 11 μ. The ultraviolet absorption spectrum (in water) of the product reveals no absorption due to the $\Delta^3$-cephem ring. The nuclear magnetic resonance spectrum ($D_2O$, 100 megacycle) of the above product shows an AB quartet due to the 2-methylene protons at 3.65 ppm, a singlet due to the thiophene 2-methylene protons at 4.07 ppm, a doublet due to the 3-exomethylene protons at 5.42 ppm (J=3 cps), two doublets due to the hydrogens at the 6 and 7-positions respectively at 5.54 and 5.60 ppm ($J_{6\text{-}7}$=4 cps) and a multiplet due to the thiophene ring protons at 7.15–7.60 ppm. Elementary analysis:

Calculated for $C_{14}H_{13}N_2O_4Na\cdot\frac{1}{2}H_2O$:
Found: C, 45.52; H, 4.36; N, 7.58
Found: C, 45.36; H, 4.04; N, 7.41

EXAMPLE 2

In a similar manner as in Example 1, the electroreduction is carried out in a buffer of a pH of 7 (0.1 M $KH_2PO_4$ and 0.1 M $Na_2HPO_4$) for 2 hours and 15 minutes. The reaction mixture is adjusted to a pH of 2 with dilute hydrochloric acid and, then, extracted with ethyl acetate. The ethyl acetate layer is washed with water and dried, followed by the addition of sodium 2-ethylhexanoate until no more precipitation occurs. The resulting precipitate is collected to obtain sodium 7-(2'-thienylacetamido)-3-exomethylenecepham-4-carboxylate. This product is in complete agreement with the compound obtained in Example 1.

EXAMPLE 3

In 2,500 parts by volume of the same buffer as used in Example 1 is dissolved 5 parts of sodium 7-phenylacetamidocephalosporanate and the solution is electrolyzed at room temperature and at 15 volts for 5 hours in a similar manner as in Example 1.

The reaction mixture is worked up in a similar manner as in Example 1 to obtain 3.7 parts of sodium 7-phenylacetamido-3-exomethylenecepham-4-carboxylate. This product melts at 220°–220°C (decomp.) Elementary analysis:

Calculated for $C_{16}H_{15}N_2O_3SNa\cdot2\frac{1}{2}H_2O$:
Found: C, 48.12; H, 5.05; N, 7.01
Found: C, 48.10; H, 5.54; N, 6.53

This product shows in the infrared spectrum (KBr disc) an absorption due to the β-lactam at 1740 $cm^{-1}$ and an absorption due to the exomethylene group at 920 $cm^{-1}$. The nuclear magnetic resonance spectrum ($D_2O$, 100 megacycles) shows an AB quartet assignable to the 2-methylene protons at 3.64 ppm, a singlet due to the hydrogen at the 4-position at 5.12 ppm, two singlets due to the 3-exomethylene protons at 5.39 and 5.41 ppm and an AB-quartet due to the hydrogens at the 6 and 7-positions at 5.46 ppm.

EXAMPLE 4

In a similar manner as in Example 1, 5 parts of sodium 7-phenoxyacetamidocephalosporanate is electrolyzed in the buffer of pH 4 (the same buffer as used in Example 1) to obtain 3.2 parts of sodium 7-phenoxyacetamido-3-exomethylenecepham-4-carboxylate. This product melts at 208°–212°C (decomp.). Elementary analysis:

Calculated for $C_{16}H_{15}N_2O_4SNa.2H_2O$:
Found: C, 47.29; H, 4.71; N, 6.89
Found: C, 47.56; H, 4.10; N, 6.69

This product shows in the infrared spectrum (KBr disc) an absorption due to the β-lactam at 1750 cm$^{-1}$ and that due to the exomethylene group at 920 cm$^{-1}$. The nuclear magnetic resonance spectrum ($D_2O$, 100 megacycles) of the product shows a quartet due to the 2-methylene protons at 3.62 ppm, a singlet due to the hydrogen in the 4-position at 5.23 ppm, a doublet due to the 3-exomethylene protons at 5.80 and 5.82 ppm and an AB quartet due to the hydrogens at the 6 and 7 positions at 5.60 ppm.

EXAMPLE 5

1. To a solution of 108 parts of sodium hydrogen carbonate in 10,000 parts by volume of water is added 500 parts of 7-(D-2-amino-2-phenylacetamido) cephalosporanic acid. The resulting aqueous solution is added to 200,000 parts by volume of a buffer (0.1 M sodium acetate and 0.1 M acetic acid) and the solution is brought to a pH of 6.5 with sodium hydrogen carbonate. The solution is electrolyzed at room temperature at 15 volts for 2 hours in the same equipment used in Example 1.

The reaction mixture is adjusted to a pH of 2.0 with dilute hydrochloric acid and washed with ethyl acetate. The resulting aqueous layer is adjusted to a pH of 7.0 with sodium hydrogen carbonate and purified with a column packed with polystyrene resin (Amberlite XAD-II: manufactured by Rohm and Haas Co., U.S.A.). The procedure gives sodium 7-(D-2-amino-2-phenylacetamido)-3-exomethylenecepham-4-carboxylate. This product melts at 178°C (sintered). Elementary analysis:

Calculated for $C_{16}H_{16}O_4N_3SNa$:
Found: C, 52.03; H, 4.36
Found: C, 51.93; H, 4.75

This product shows in the infrared spectrum (KBr disc) an absorption due to the β-lactam ring at 1750 cm$^{-1}$ and that due to the exomethylene group at 917 cm$^{-1}$. The nuclear magnetic resonance spectrum ($D_2O$, 100 megacycles) of the product shows a quartet assignable to the 2-methylene protons at 3.50 ppm, a singlet due to the hydrogen at the 4-position at 5.07 ppm, a singlet due to the 3-exomethylene protons at 5.33 ppm, and a doublet due to the hydrogen at the 7 position at 5.65 ppm. ($J_{7-6}$=4 cps).

2. To 400 parts by volume of pyridine are added 16.5 parts of sodium 7-(D-2-amino-2-phenylacetamideo)-3-exomethylenecepham-4-carboxylate and 80 parts by volume of trimethylchlorosilane.

The mixture is allowed to stand at 25°C for 24 hours, and the reaction mixture is concentrated under reduced pressure at room temperature. The concentrate is diluted with 100 parts of water and filtrated. The filtrate is adjusted to a pH of 4.0 and cooled. The resulting precipitates are collected by filtration to give 15 parts of 7-(D-2-amino-2-phenylacetamido)-3-methyl-3-cephem-4-carboxylic acid. In the ultraviolet spectrum, this compound shows an absorption characteristic of a $\Delta^3$-cephem ring at 260 mμ (∈=7,700). The nuclear magnetic resonance spectrum of this compound (trifluoroacetic acid, 100 megacycles) shows a singlet due to the 3-methyl protons at 2.30 ppm and a quartet due to the 2-methylene protons at 3.35 ppm.

EXAMPLE 6

1. In a solution of 3.5 parts of sodium hydrogen carbonate in 100 parts of water is dissolved 11 parts of 7-aminocephalosporanic acid and the resulting aqueous solution is added to 2000 parts by volume of a buffer (0.1 M $Na_2HPO_4$-dilute hydrochloric acid). (The pH becomes 6.9). In a similar manner as in Example 1, the solution is electrolyzed at room temperature at 15 volts for 4 hours. The reaction product is immediately lyophilized and the resulting powder is dissolved in a small amount of water. The solution is treated with a column packed with polystyrene resin (Amberlite XAD-II: manufactured by Rohm & Haas Co. U.S.A.), whereby 7 parts of sodium 7-amino-3-exomethylenecepham-4-carboxylate is obtained. The nuclear magnetic resonance spectrum (deuterio-dimethylsulfoxide, 100 megacycles) of the above product shows a quartet assignable to the 2-methylene protons at 3.44 ppm, a singlet due to the hydrogen at the 4 position at 4.40 ppm and an absorption due to the 3-exomethylene protons at 4.85 and 4.89 ppm. The product shows in the infrared spectrum (KBr disc) an absorption due to the β-lactam at 1745 cm$^{-1}$ and that due to the exomethylene at 918 cm$^{-1}$.

2. 15 Parts of disodium salt of 7-(5-carboxy-5-aminovalerylamino)-3-exomethylenecepham-4-carboxylic acid is dissolved in 40 parts by volume of 99 percent formic acid under ice-cooling.

To this cooled solution is added a solution of 3 parts of nitrosyl chloride in one part by volume of formic acid. After 5 minutes, the reaction mixture is concentrated under reduced pressure. To the residue is added 35 parts by volume of water, followed by adjusting to a pH of about 35 with an aqueous solution of sodium hydroxide under ice-cooling. The resulting precipitates are collected by filtration to obtain 7-amino-3-exomethylenecepham-4-carboxylic acid. Elementary analysis:

Calculated for $C_8H_{10}N_2O_3S.1/4H_2O$:
Found: C, 43.92; H, 4.83; N, 12.82; S, 14.65
Found: C, 43.76; H, 4.73; N, 12.40; S, 14.43

In NMR spectrum (deuterio trifluoroacetic acid, 100 megacycles), this product shows an AB-quartet due to the 2-methylene protons at 3.61 ppm, two doublets due to the hydrogens at the 6 and 7 positions at 5.18 and 5.68 ppm, respectively ($J_{6-7}$=4 cps), a singlet due to the hydrogen at the 4-position at 5.36 ppm and a slightly broad singlet assignable to the 3-exomethylene protons at 5.48 ppm.

3. A solution of 10 parts of sodium 7-amino-3-exomethylenecepham-4-carboxylate, 30 parts by volume of trimethylchlorosilane in 100 parts by volume of pyridine is shaken vigorously and kept standing overnight at 25°C. After the addition of 100 parts by volume of chloroform, the mixture is condensed under reduced pressure. The residue is dissolved in a 5 percent aqueous solution of sodium hydrogen carbonate under cooling and the insolubles are filtered off.

The pH of the filtrate is adjusted to 3.5 and the separated solid is collected to give 6 parts of 7-amino-3-methyl-3-cephem-4-carboxylic acid.

4. In 60 parts by volume of dimethylacetamide is suspended 3.65 parts of sodium 7-amino-3-exomethylenecepham-4-carboxylate and, then, to this suspension is added dropwise a solution of 10 parts D-2-($\beta$-methylsulfonylethoxycarbonylamino)-2-phenylacetyl chloride in 20 parts by volume of acetonitrile at 18°–20°C. The mixture is stirred for 1 hour. To the resulting reaction mixture is added 500 parts by volume of water, followed by extraction with ethyl acetate. The ethyl acetate layer is concentrated and the concentrate is dissolved in 40 parts by volume of tetrahydrofuran. To the solution is added a solution of sodium 2-ethylhexanoate in isopropanol, and the precipitates formed thereupon are collected by filtration to obtain sodium 7-[D-2-($\beta$-methylsulfonylethoxycarbonylamino)-2-phenylacetamido]-3-exomethylenecepham-4-carboxylate.

In 100 parts by volume of water is dissolved 5.19 parts of the above product, followed by the addition of 11 parts by volume of a 1N-aqueous solution of sodium hydroxide. The mixture is stirred at room temperature for 30 minutes. The resulting reaction mixture is adjusted to a pH of 1.5 with dilute hydrochloric acid and, then, to a pH of 8.00 with a 1N-aqueous solution of sodium hydroxide. The solution is treated with a column packed with polystyrene resin (Amberlite XAD-II: manufactured by Rohm & Haas Co., U.S.A.) to obtain sodium 7-(D-2-amino-2-phenylacetamido)-3-exomethylenecepham-4-carboxylate.

This product is identical with the compound obtained in Example 5 in all repsects.

EXAMPLE 7

1. In 800 parts by volume of tetrahydrofuran is dissolved 5.4 parts of methyl 7-(2'-thienylacetamido)-cephalosporanate and the solution is added to 1,200 parts by volume of a buffer (0.1 M sodium acetate and 0.1 M acetic acid) containing 20 parts of lithium bromide. The solution (pH 5) is electrolyzed at room temperature at 15 volts for 3.5 hours in a similar manner as in Example 1. The reaction mixture is distilled under reduced pressure to remove most of the tetrahydrofuran and the residue is extracted with chloroform. From the chloroform layer 4.7 parts of methyl 7-(2'-thienylacetamido)-3-exomethylenecepham-4-carboxylate is obtained.

This product has a melting point of 77.5°–78.5°C and gives the following elementary analysis, Calcd. for $C_{15}H_{16}O_4N_2S_2$:
Found: C, 51.12; H, 4.57; N, 7.94
Found: C, 51.38; H, 4.34; N, 7.92

The molecular weight of this compound as determined by mass analysis is 352 (theoretical 352).

The compound shows in the infrared spectrum (chloroform) an absorption due to the $\beta$-lactam at 5.67 $\mu$ and an absorption due to the exomethylene group at 11 $\mu$. The ultraviolet absorption spectrum (ethanol) of the compound shows an absorption maximum at 233 m$\mu$ ($\epsilon$=9092) but no absorption indicative of a $\Delta^3$-cephem ring at 260 m$\mu$.

The nuclear magnetic resonance spectrum (deuteriochloroform 100 megacycles) of the same compound shows a pair of doublet (J=13 cps) due to the 2-methylene protons at 3.12 and 3.62 ppm, a singlet due to the ester methyl group at 3.72 ppm, a singlet due to the 2-methylene protons of the thiophene ring at 3.78 ppm, a singlet due to the protons at 5.01 ppm, a broad singlet due to the 3-exomethylene protons at 5.17 ppm, a doublet ($J_{6-7}$=4 cps) due to the proton at the 6-position at 5.32 ppm, a doublet of doublet ($J_{6-7}$=4 cps, $J_{7-NH}$=10 cps) due to the protons at the 7-position at 5.60 ppm, a doublet ($J_{7-NH}$=10 cps) due to the 7-NH at 6.45 ppm and a multiplet due to the thiophene ring protons at 6.80–7.20 ppm.

2. In 4 parts by volume of pyridine is dissolved 0.3 parts of methyl 7-(2'-thienylacetamido)-3-exomethylenecepham-4-carboxylate and the solution is allowed to stand at 22°C for 24 hours. The reaction mixture is poured into 100 parts of water and the mixture is extracted with chloroform. The chloroform layer is washed with dilute hydrochloric acid and, then, with water, followed by drying over magnesium sulfate. Finally, the chloroform is distilled off, whereupon 0.3 parts of methyl 7-(2'-thienylacetamido)-3-methyl-3-cephem-4-carboxylate is obtained. This product shows in the ultraviolet spectrum (ethanol) an absorption due to the $\Delta^3$-cephem ring at 260 m$\mu$. The nuclear magnetic resonance spectrum (deuteriochloroform, 100 megacycles) of this product shows a singlet due to the 3-methyl protons at 2.10 ppm, an AB quartet due to the 2-methylene protons at 3.28 ppm, a singlet due to the ester methyl group at 3.69 ppm, a singlet due to the thiophene 2-methylene protons at 4.01 ppm, a doublet due to the proton at the 6-position at 5.10 ppm ($J_{6-7}$=4 cps), a doublet of doublet due to the hydrogen at the 7-position at 5.70 ppm ($J_{6-7}$=4 7-NH$J_{7-NH}$=$^{10}$ cps), a doublet due to the 7-NH group at 6.52 ppm ($J_{7-NH}$=10 cps) and a multiplet due to the thiophene ring protons at 6.90–7.30 ppm.

EXAMPLE 8

In 2,000 parts by volume of a buffer (0.1 M $KH_2PO_4$ and 0.1 M $Na_2HPO_4$) is dissolved 10 parts of 7-(2'-thienylacetamido)-3-(1''-pyridylmethyl)-3-cephem-4-carboxylic acid betaine (The pH becomes 7.0). In a similar manner as in Example 1, the solution is electrolyzed in a cell which contains a mercury pool cathode and a horizontal platinum anode, separated from one another by means of a sintered glass partition of medium porosity, at room temperature under stirring at 15 volts for 3.5 hours. The reaction mixture is adjusted to a pH of 2.0 with dilute hydrochloric acid and extracted with ethyl acetate. The ethyl acetate layer is then extracted with a 5 percent aqueous solution of sodium hydrogen carbonate and the aqueous layer is brought to a pH of 2.0 with dilute hydrochloric acid and extracted with ethyl acetate.

The ethyl acetate layer is washed with water, and dried over magnesium sulfate. Evaporation of ethyl acetate gives 7-(2'-thienylacetamido)-3-exomethylenecepham-4-carboxylic acid.

EXAMPLE 9

In 2,000 parts by volume of a buffer of pH 4.0 (0.1 M sodium acetate and 0.1 M acetic acid) is dissolved 5.16 parts of sodium 7-(2'-thienylacetamido)-3-acetylthiomethyl-3-cephem-4-carboxylate and the solution is electrolyzed in a cell which contains a mercury pool cathode and a horizontal platinum anode, separated from one another by means of a sintered glass partition of medium porosity, at room temperature under stirring at 15 volts for 5 hours.

The reaction mixture is worked up in a similar manner as in Example 1 to obtain 7-(2'-thienylacetamido)-3-exomethylenecepham-4-carboxylic acid.

EXAMPLE 10

1. In 2,000 parts by volume of a buffer of pH 4.0 (0.1 M sodium acetate and 0.1 M acetic acid) is dissolved 7 parts of sodium 7-[1'-(1H)-tetrazolylacetamido]-3-[5''-(2''-methyl-1'',3'',4''-thiadiazolyl)]-thiomethyl-3-cephem-4-carboxylate and the resulting solution is electrolyzed in a cell which contains a mercury pool cathode and a horizontal platinum anode, separated from one another by means of a sintered glass partition of medium porosity, at room temperature under stirring at 15 volts for 8 hours. The reaction mixture is worked up in a similar manner as in Example 1 to obtain sodium 7-[1-(1H)-tetrazolylacetamido)]-3-exomethylenecepham-4-carboxylate. This product shows in the infrared spectrum (KBr disc) an absorption due to the $\beta$-lactam at 1760 cm$^{-1}$ and that due to the exomethylene group at 922 cm$^{-1}$. The nuclear magnetic resonance spectrum (D$_2$O, 100 megacycles) of this product shows a quartet assignable to the 2-methylene protons at 3.68 ppm, a singlet due to the hydrogen at the 4-position at 5.16 ppm, a doublet due to the 3-exomethylene protons at 5.42 and 5.46 ppm, a doublet due to the hydrogens in the 6 and 7 positions at 5.60 and 5.68 ppm, respectively, a singlet due to the tetrazolyl 1-methylene protons at 5.70 ppm and a singlet due to the hydrogen in the 5 position of the tetrazole ring at 9.44 ppm.

EXAMPLE 11

In 500 parts by volume of dimethylformamide is dissolved 3 parts of 7-(2'-thienylacetamido)-3-hydroxymethyl-3-cephem-4-carboxylic acid lactone and the resulting solution is added to 1,500 parts by volume of a buffer (0.1 M sodium acetate and 0.1 M acetic acid). To this solution is added 10 parts of lithium bromide, and the mixture is electrolyzed in the same equipment as in the Example 1 at room temperature 15 volts for 12 hours. The reaction mixture is adjusted to a pH of 2.0 with dilute hydrochloric acid and extracted with ethyl acetate. The ethyl acetate layer is washed with water and dried, followed by the addition of ether solution of diazomethane. The mixture is treated in the conventional manner to obtain methyl 7-(2'-thienylacetamido)-3-exomethylenecepham-4-carboxylate. This product is identical with the compound obtained in Example 7 in all respects.

EXAMPLE 12

In 2,000 parts by volume of a buffer (0.1 M sodium acetate and 0.1 M of acetic acid) is dissolved 10 parts of sodium 7-[($\beta$-methylsulfonyl)ethoxycarbonylamino]cephalosporanate (The pH becomes about 4. The solution is electrolyzed at room temperature at 15 volts for 7 hours. The reaction mixture is worked up in a similar manner as in Example 1 to obtain 6 parts of sodium 7-[($\beta$-methylsulfonyl)ethoxycarbonylamino]-3-exomethylenecepham-4-carboxylate. This product melts at 165°–167°C. Elementary analysis:
Calculated for $C_{12}H_{15}N_2O_7S_2Na \cdot H_2O$:
Found: C, 35.64; H, 4.23; N, 6.92
Found: C, 35.62; H, 4.35; N, 6.94

The above product shows in the infrared region of the spectrum (KBr) an absorption due to the $\beta$-lactam at 1750 cm$^{-1}$ and that due to the exomethylene group at 911 cm$^{-1}$. The nuclear magnetic resonance spectrum (D$_2$O. 100 megacycles) shows a singlet due to the methylsulfonyl methyl protons at 3.36 ppm, a quartet due to the 2-methylene protons at 3.68 ppm, a singlet due to the hydrogen at the 4-position at 5.14 ppm, a doublet due to the 3-exomethylene protons at 5.43 ppm, and two doublets assignable to the hydrogens at the 6 and 7 positions at 5.49 and 5.59 ppm, respectively.

EXAMPLE 13

In 2,000 parts by volume of a buffer (pH 4: 0.1 M sodium acetate and 0.1 M acetic acid) is dissolved 10 parts of sodium 7-(2'-thienylacetamido)cephalosporanate and the solution is electrolyzed at room temperature at 15 volts for 17 hours, using an aluminum cathode and a platinum anode with a sintered glass partition. The reaction mixture is worked up in a similar manner as in Example 1 to obtain 5.2 parts of sodium 7-(2'-thienylacetamido)-3-exomethylenecepham-4-carboxylate.

EXAMPLE 14

In 2,000 parts by volume of a buffer (pH 4; 0.1 M sodium acetate and 0.1 M acetic acid) is dissolved 10 parts of sodium 7-(2'-thienylacetamido)cephalosporanate, and the solution is electrolyzed at room temperature at 15 volts for 2 hours, using a lead cathode, a carbon rod anode with a sintered glass partition. The reaction mixture is worked up in a similar manner as in Example 1 to obtain sodium 7-(2'-thienylacetamido)-3-exomethylenecepham-4-carboxylate.

EXAMPLE 15

The starting solution employed in Example 14 is electrolyzed at room temperature at 15 volts for 15 hours, using a zinc cathode, a platinum anode, with a sintered glass partition, whereby sodium 7-(2'-thienylacetamido)-3-exomethylenecepham-4-carboxylate is obtained.

EXAMPLE 16

1. In 4,000 parts by volume of a buffer solution of pH 6.9 (0.1 M Na$_2$HPO$_4$-dilute hydrochloric acid) is dissolved 20 parts of cephalosporin C sodium salt dihydrate.

The solution is electrolyzed at room temperature at 15 volts, with a platinum anode, a mercury pool cathode, separated from one another by means of a sintered glass partition of medium porosity, for 5.5 hours.

The reaction solution (pH 7.2) is lyophilized and the resulting powder is dissolved in 1,000 parts of water.

The resulting solution is subjected to electrodialysis, using an ion exchange membrane (Selemion CMV and AMV; manufactured by Asahi Glass Co., Ltd., Japan). The resulting solution is again lyophilized to obtain (18.23 parts of powder of sodium 7-(5-amino-5-carboxyvarerylamido)-3-exomethylenecepham-4-carboxylate trihydrate. Elementary analysis:

Calculated for $C_{14}H_{18}O_6N_3SNa \cdot 3H_2O$:
Found: C, 38.80; H, 5.58; N, 9.70
Found: C, 38.88; H, 4.95; N, 9.62

The nuclear magnetic resonance spectrum ($D_2O$, 100 megacycles) shows a quartet due to 2-methylene protons at 3.70 ppm, a singlet due to the hydrogen at the 4 position at 5.21 ppm, a singlet due to the 3-exomethylene protons at 5.63 ppm.

2. A solution of 1.0 parts of sodium 7-(5'-amino-5'-carboxyvalerylamido)-3-exomethylenecepham-4-carboxylate, 30 parts by volume of trimethylchlorosilane in 200 parts by volume of triethylamine is shaken vigorously and kept standing overnight at 25°C. The mixture is condensed under reduced pressure and to the residue is added 1 part by volume of water under cooling.

The pH of the solution is adjusted to 4.5–5.0. The solution, after filtration, is passed through a column packed with 300 parts of active charcol and eluted with a 50 percent aqueous solution of acetone to give 7 parts of sodium 7-(5'-amino-5'-carboxyvalerylamido)-3-methyl-3-cephem-4-carboxylate.

EXAMPLE 17

In 4,000 parts of volume of a buffer solution of pH 4.2 (0.1 M sodium acetate and 0.1M acetic acid) is dissolved 22 parts of sodium 7-(2'-thienylacetamido)-3-(2''-pyridylthiomethyl)-3-cephem-4-carboxylate 1''-oxide. The solution is electrolyzed for 13.5 hours in the similar manner as in Example 1. The reaction mixture is worked up in the conventional manner to obtain sodium 7-(2'-thienyl-acetamido)-3-exomethylenecepham-4-carboxylate.

This product is identical with the compound obtained in Example 1 in all respects.

EXAMPLE 18

1. In 2,000 parts by volume of a buffer solution (0.1M sodium acetate, 0.1 M acetic acid) is dissolved a solution of 5 parts of 7-[D-2-amino-2-(1-cyclohexenyl)acetamido]cephalosporanic acid and 1.17 parts of sodium hydrogen carbonate in 100 parts by volume of water. The solution is adjusted to a pH of 6.5 with sodium hydrogen carbonate and electrolyzed for 2 hours at room temperature at 15 volts, with a mercury anode and a platinum cathode separated from one another by means of a sintered glass partition of medium porosity. The reaction mixture is lyophilized and the resulting powder is dissolved into 200 parts by volume of water. The solution is adjusted to a pH of 7.0 with sodium hydrogen carbonate and purified with a column packed with polystyrene resin (XAD-II: manufactured by Rohm & Haas Co., U.S.A.) and eluted with 3 percent aqueous ethanol) to obtain sodium 7-[D-2-amino-2-(1-cyclohexenyl)-acetamido]-3-exomethylenecepham-4-carboxylate.

2. Thus-obtained product is dissolved in 8 parts of pyridine and to the solution is added 2 parts of trimethylchlorosilane. The solution is allowed to stand at 25°C for 24 hours.

The reaction mixture is concentrated under reduced pressure at room temperature. The residue is dissolved in 2 parts of water and the solution is filtered. After adjusting to a pH of about 3.5, the filtrate is allowed to stand to give 7-[D-2-amino-2-(1-cyclohexenyl)acetamido]-3-methyl-3-cephem-4-carboxylic acid.

The product shows in the ultraviolet spectrum (in an aqueous solution of sodium hydrogen carbonate) an absorption maximum at 258m$\mu$ and in the infrared spectrum (KBr disc) an absorption due to a $\beta$-lactam at 6.3 $\mu$.

EXAMPLE 19

In 3,000 parts by volume of a phosphate buffer (pH 6.0) is dissolved 7.2 parts of disodium 7-(2-thienylacetamido)-3-thiosulfatomethyl-3-cephem-4-carboxylate (Bunte salt) and the solution is electrolyzed for 5 hours with a platinum anode and a mercury pool cathode, separated from one another by means of a sintered glass partition at room temperature at 15 volts. The reaction solution is adjusted to a pH of 2.0 with dilute hydrochloric acid and, then, extracted with ethyl acetate. The ethyl acetate layer is worked up in a similar manner as in Example 1 to obtain 3.02 parts of sodium 7-(2'-thienylacetamido)-3-exomethylenecepham-4-carboxylate.

EXAMPLE 20

In 1,500 parts by volume of acetonitrile is dissolved 5.2 parts of 7-(2'-thienylacetamido)-3-mercaptomethyl-3-cephem-4-carboxylic acid $\gamma$-thiolactone and to the solution is added 600 parts by volume of 0.1 M $KH_2PO_4$ and 400 parts by volume of 0.1 M $Na_2HPO_4$ and then electrolyzed for 4 hours, with a platinum anode and a mercury pool cathode separated from one another by means of a sintered glass partition at room temperature at 15 volts. From the resulting solution insoluble matters are removed by filtration and then most of acetonitrile is distilled off under reduced pressure.

The residue is adjusted to a pH of 2.0 with dilute hydrochloric acid and, then, extracted with ethyl acetate. The ethyl acetate layer is worked up in a similar manner as in Example 1 to obtain sodium 7-(2'-thienylacetamido)-3-exomethylenecepham-4-carboxylate.

EXAMPLE 21

In 4,000 parts by volume of a phosphate buffer (pH 6.0) is dissolved 20 parts of disodium 7-(5'-amino-5'-carboxyvalerylamido-3-thiosulfatomethyl-3-cephem-4-carboxylate (Bunte salt) and the solution is electrolyzed for 5 hours with a platinum anode and a mercury pool cathode separated from one another by means of a sintered glass partition at room temperature at 15 volts. The resulting solution is passed through the column packed with 500 parts of activated charcoal and then eluted with a 50 percent aqueous acetone and the eluate is adjusted to a pH of 6.0 with a 5 percent aqueous solution of sodium hydrogen carbonate. The solvent is removed off and the residue is lyophilized, whereupon 13 parts of sodium 7-(5'-amino-5'-carboxyvalerylamido)-3-exo-methylenecepham-4-carboxylate hydrate is obtained.

What we claim is:

1. A process for producing a cephalosporin having a 3-exomethylene group, which comprises subjecting a solution of a cephalosporin having a 3-substituted methyl group to electroreduction at a pH of 2–7.

2. The process as claimed in claim 1, wherein the 3-substituted methyl group is an acyloxymethyl, acylthiomethyl or quaternary ammonium methyl group or a group of the formula $CH_2SR''$, wherein $R''$ represents an organic or inorganic group, or a methyl group substituted with a group forming a five-membered ring together with a carboxyl group at the four-position.

3. The process as claimed in claim 1, wherein the electroreduction is carried out employing an electrode selected from mercury, carbon, zinc and aluminum as a cathode.

4. A process for producing a cephalosporin having a 3-methyl group, which comprises subjecting a solution of a cephalosporin having a 3-substituted methyl group to electroreduction at a pH of 2–7 isomerizing the thus-obtained cephalosporin compound having a 3-exomethylene group to obtain the 3-methyl compound of the formula

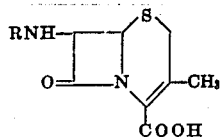

wherein R is hydrogen or an acyl group.

5. The process as claimed in claim 4, wherein the 3-substituted methyl group is an acyloxy, acylthio or quaternary ammonium group or a group of the formula -SR'', wherein R'' represents an organic or inorganic group or a group forming a five-membered ring together with a carboxyl group at the four-position.

6. The process as claimed in claim 4, wherein the electroreduction is carried out employing an electrode selected from mercury, carbon, zinc and aluminum as a cathode.

7. The process as claimed in claim 1, wherein the 3-substituted methyl group is an acyloxy methyl group.

8. The process as claimed in claim 7, wherein the acyloxy methyl group is an acetyloxymethyl group.

9. The process as claimed in claim 1, wherein the starting cephalosporin compound has an amino, 5-amino-5-carboxyvalerylamino, thienylacetylamino, phenylacetylamino, phenoxyacetylamino, tetrazolyacetylamino, phenylglycylamino, β-methylsulfonylethylcarbonylamino or 1-cyclohexenylglycylamino group at the 7 position.

10. The process as claimed in claim 1, wherein the starting cephalosporin compound has an amino group at the 7 position.

11. The process as claimed in claim 1, wherein the starting cephalosporin compound has a 5-amino-5-carboxyvalerylamino group at the 7 position.

* * * * *